United States Patent [19]

Hirai et al.

[11] Patent Number: 5,224,209
[45] Date of Patent: Jun. 29, 1993

[54] SYSTEM FOR CHOOSING BETWEEN OPERATION MODES IN A DATA PROCESSING SYSTEM BY INTERACTING WITH A DISPLAYED A MULTINODAL HIERARCHAL FIGURE

[75] Inventors: Akihiro Hirai; Hideaki Shinohara, both of Yokohama, Japan

[73] Assignee: Hitachi, Ltd., Tokyo, Japan

[21] Appl. No.: 854,946

[22] Filed: Apr. 23, 1986

[30] Foreign Application Priority Data

Apr. 24, 1985 [JP] Japan .................................. 60-86353

[51] Int. Cl.⁵ .................................................. G06F 9/00
[52] U.S. Cl. ........................... 395/150; 364/948.11;
364/948.21; 364/948.2; 364/DIG. 2; 395/775
[58] Field of Search ... 364/200 MS File, 900 MS File,
364/518, 521; 340/747, 720, 709, 724, 825.52,
703, 701; 395/100, 800, 375, 650, 600, 150, 775

[56] References Cited

U.S. PATENT DOCUMENTS

| | | | |
|---|---|---|---|
| 4,204,253 | 5/1980 | van den Hanenberg | 364/200 |
| 4,429,385 | 1/1984 | Cichelli et al. | 364/900 |
| 4,451,895 | 5/1984 | Sliwkowski | 340/707 |
| 4,455,619 | 6/1984 | Masui | 364/900 |
| 4,460,960 | 7/1984 | Anderson | 364/900 |
| 4,477,880 | 10/1984 | Advani | 364/900 |
| 4,521,770 | 6/1985 | Rhyne | 340/703 |
| 4,552,718 | 11/1985 | Impink | 376/245 |
| 4,555,759 | 11/1985 | McCaskill et al. | 364/300 |
| 4,570,217 | 2/1986 | Allen et al. | 364/188 |
| 4,571,679 | 2/1986 | Russell | 364/900 |
| 4,587,520 | 5/1986 | Astle | 340/710 |
| 4,611,298 | 9/1986 | Schuldt | 364/900 |
| 4,648,046 | 3/1987 | Copenhauer et al. | 364/518 |
| 4,686,522 | 8/1987 | Hernandes | 340/747 |
| 4,700,297 | 10/1987 | Hagel | 364/408 |
| 4,710,763 | 12/1987 | Franke et al. | 364/518 |
| 4,710,763 | 12/1987 | Franke et al. | 364/518 |
| 4,733,354 | 3/1988 | Potter | 364/413.02 |
| 4,751,684 | 6/1988 | Holt | 364/200 |
| 4,768,144 | 8/1988 | Winter et al. | 364/200 |
| 4,821,211 | 4/1989 | Torres | 364/521 |
| 4,829,426 | 5/1989 | Burt | 364/300 |
| 4,831,524 | 5/1989 | Furgerson | 364/900 |
| 4,870,561 | 9/1989 | Love | 364/192 |
| 4,890,257 | 12/1989 | Anthias | 364/900 |

*Primary Examiner*—Thomas C. Lee
*Assistant Examiner*—Eric Coleman
*Attorney, Agent, or Firm*—Antonelli, Terry, Stout & Kraus

[57] ABSTRACT

In a data processing system having a display, a position indication on a screen of the display, an input unit for inputting data including characters and symbols, and a unit to execute processing in which the execution modes are configured in a hierarchic structure, a mode hierarchic figure is displayed on the screen of the display, the indication position of the operator in the mode hierarchy figure is detected, a destination mode is calculated from the detected information and data representing correspondences between the mode names and positions on the screen, and a mode change is achieved, thereby facilitating the mode transition between modes configured in a complex multilevel hierarchic structure.

6 Claims, 5 Drawing Sheets

FIG. 5

| MODE NAME | POSITION IN FIGURE OF MODE HIERARCHY | | | |
|---|---|---|---|---|
| | MINIMUM VALUE ON X AXIS | MAXIMUM VALUE ON X AXIS | MINIMUM VALUE ON Y AXIS | MAXIMUM VALUE ON Y AXIS |
| FSL (FUNCTION SELECTION MODE) | 15 | 26 | 7 | 9 |
| EFS (FILE SELECTION MODE) | 37 | 48 | 3 | 6 |
| EDT (EDITING MODE) | 53 | 60 | 3 | 5 |
| USL (UTILITY SELECTION MODE) | 37 | 48 | 12 | 16 |
| FAL (FILE ALLOCATION MODE) | 57 | 72 | 16 | 18 |
| FDL (FILE DELETION MODE) | 57 | 72 | 16 | 18 |
| END (END OF SYSTEM EXECUTION) | 3 | 10 | 7 | 9 |

SYSTEM FOR CHOOSING BETWEEN OPERATION MODES IN A DATA PROCESSING SYSTEM BY INTERACTING WITH A DISPLAYED A MULTINODAL HIERARCHAL FIGURE

BACKGROUND OF THE INVENTION

The present invention relates to a data processing architecture which has a plurality of execution modes changeable according to the operator, and in particular, to a data processing method and a data processing system in which the execution modes are configured in a hierarchic structure.

In the conventional system in which the execution modes are configured in a hierarchic structure, for example, in a system discussed in a reference "Screen Editor for General-Purpose Character Display" described by Tetsuhiko Tabata and Noriko Sugiyama in the Information Processing, vol. 25, No. 8, pp. 813-819 (1984), a mode change is basically achieved by executing a command which changes the active mode to another mode which is one level higher or lower than the active mode. Consequently, to change the active mode to a mode other than said another mode, the command must be repeatedly entered and executed, which leads to deterioration of operability and operation efficiency. For each mode, even if a command changing the present mode to any other possible mode is provided to overcome the difficulty, an excessive number of commands are required, which causes another problem in that the operator load to memorize such commands is increased.

SUMMARY OF THE INVENTION

It is therefore an object of the present invention to provide a data processing method and a data processing system in which operations for changing execution modes are facilitated even when the execution modes are structured in a hierarchic configuration, thereby solving the prior art problems. To this end, the present invention is characterized in that in a data processor having a display, indication means on a screen of the display, means for inputting the content of the indication, and means for executing processing in accordance with said input; a mode hierarchy figure representing hierarchical relations between the modes is displayed on the screen of the display and a position of operator indication on the mode hierarchy figure is recognized so as to execute a mode change based on information at the operator indication position.

BRIEF DESCRIPTION OF THE DRAWINGS

The present invention will be apparent from the following detailed description taken in conjunction with the accompanying drawings in which:

FIG. 5 is a diagram illustrating correspondences between the mode names and positions in the mode hierarchy figure.

DESCRIPTION OF THE PREFERRED EMBODIMENT

Figure 1:
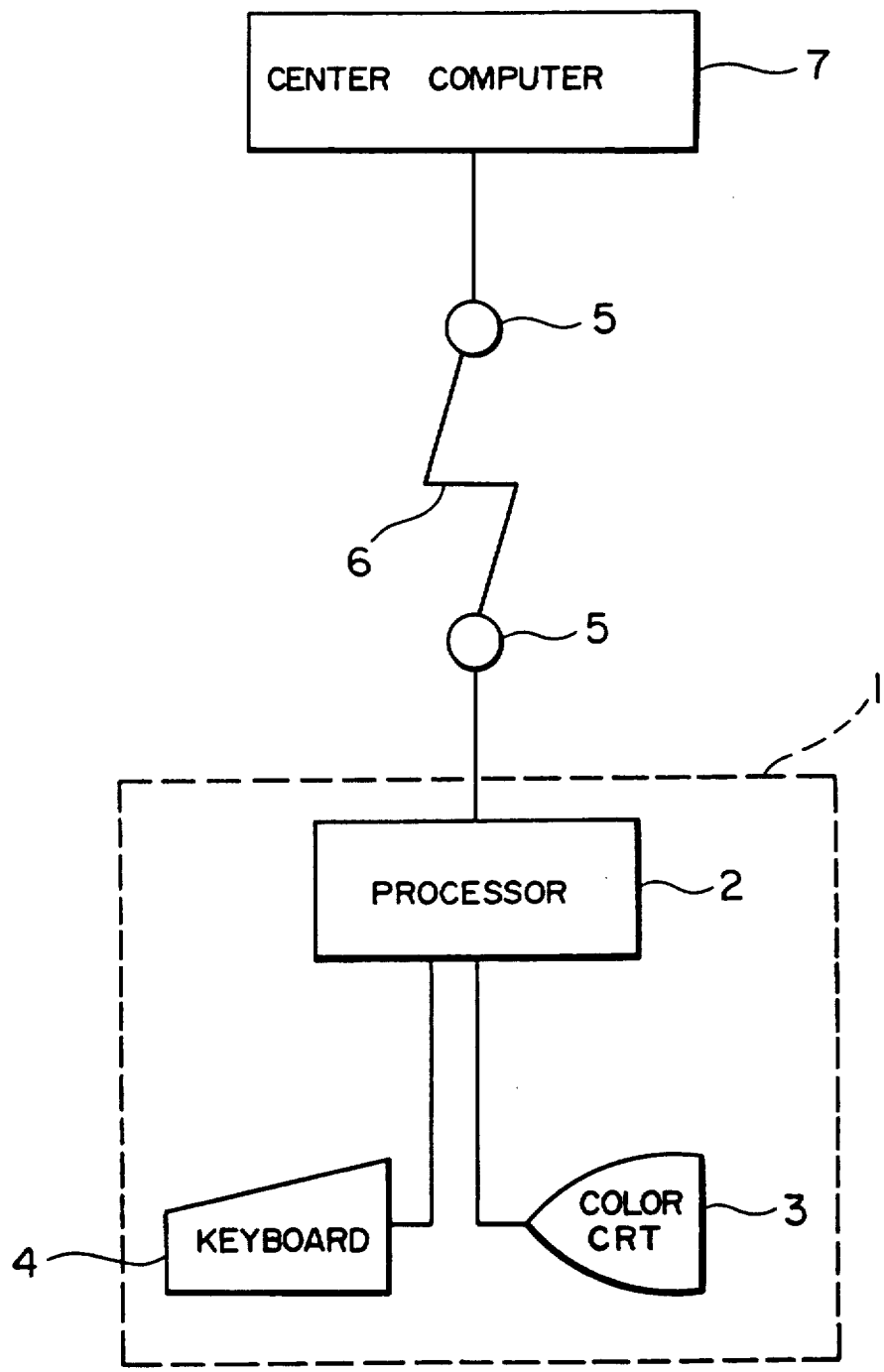
FIG. 1 is a configuration diagram illustrating the overall program editing system according to the present invention.

An embodiment of the present invention will be described in detail with reference to the accompanying drawings. FIG. 1 is a block diagram showing an embodiment in which the present invention is applied to a program editing system. A terminal 1 of the present invention includes a processor 2, a color cathode-ray tube (CRT) 3, a keyboard 4 and is connected to a center computer 7 via a modem and a communication line 6. Under control of the center computer 7, the terminal 1 establishes a display screen on the color CRT 3. An input data from the keyboard 4 is transferred to the center computer 7 in response to depression of a transmission key or the like.

Figure 2:
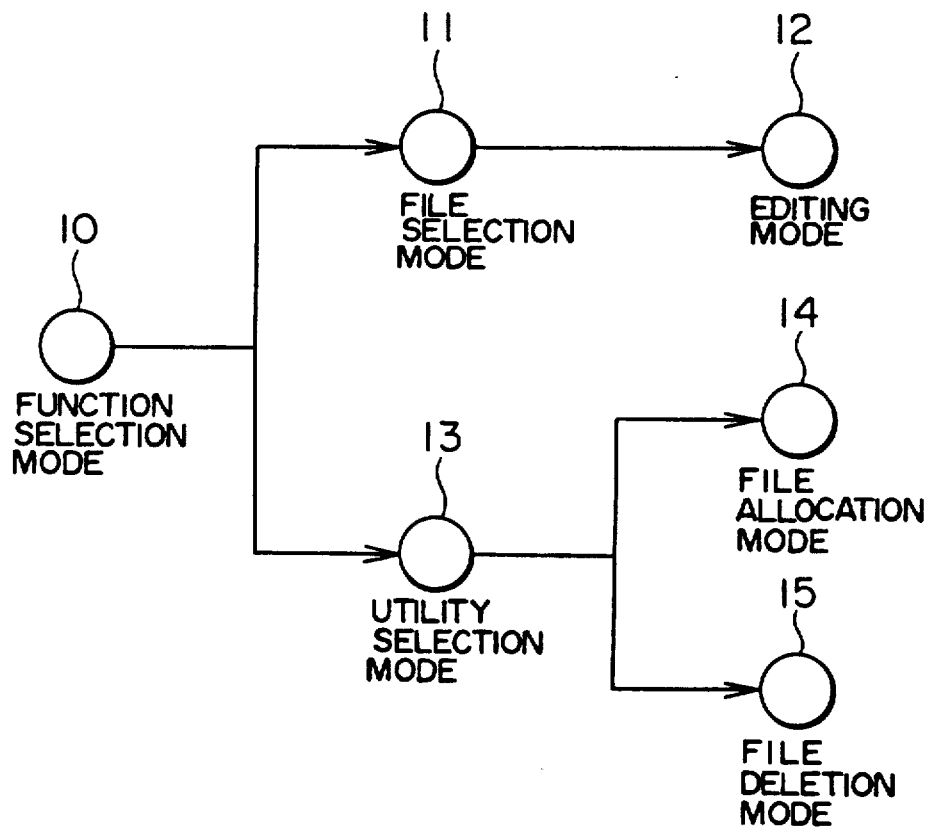
FIG. 2 is a hierarchic diagram depicting the execution modes of the program editing system of FIG. 1.
Figure 3:
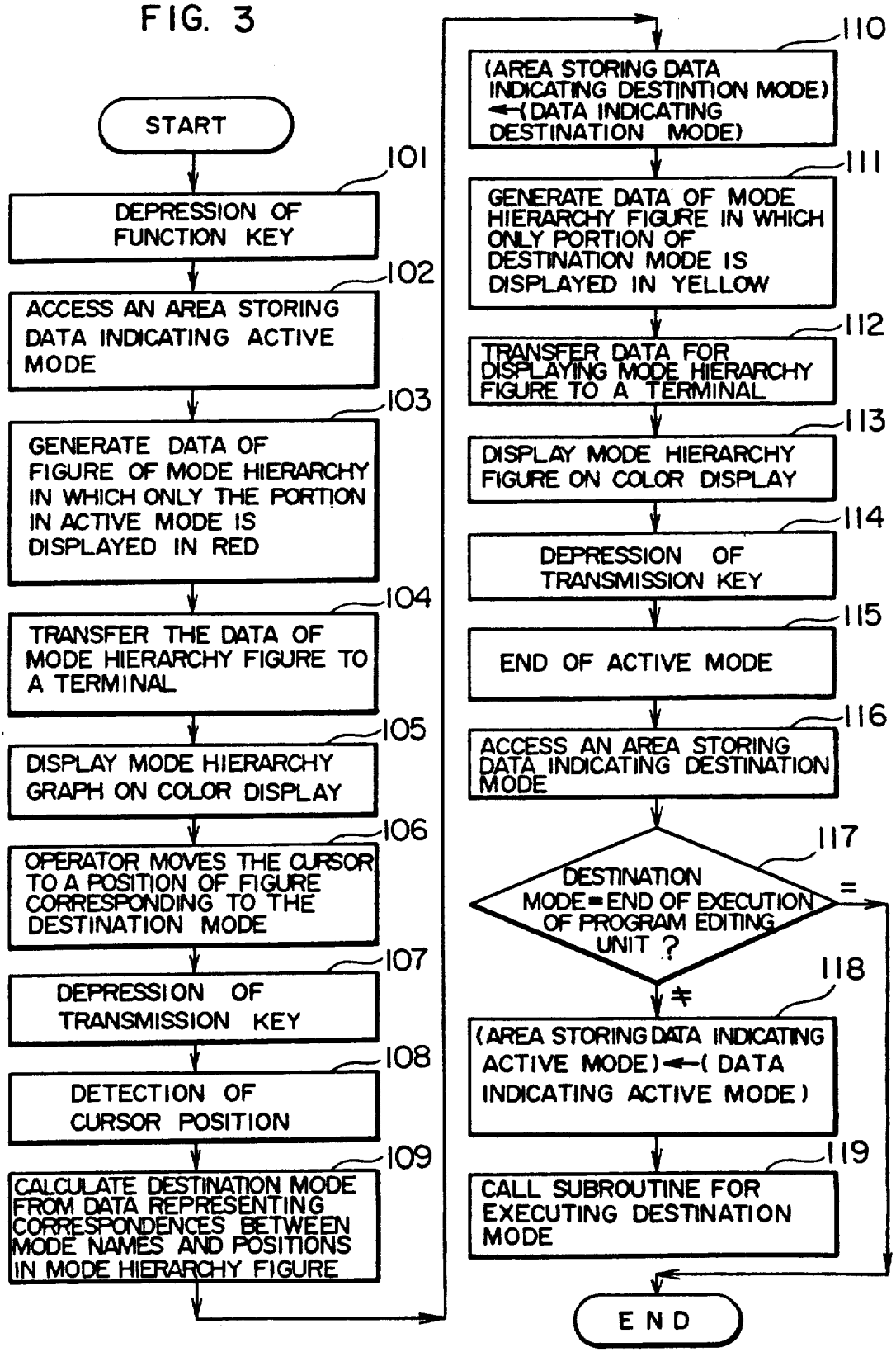
FIG. 3 is a flowchart showing a processing flow of the program editing system of FIG. 1.

FIG. 2 is a diagram showing the hierarchical relations between the execution modes in the program editing system of FIG. 1. A function selection mode 10 is used by the operator to select an editing operation or a utility usage, a file selection mode 11 is set by the operator to input a file name for an editing operation, an editing mode 12 is provided to effect an editing operation, a utility selection mode 13 is employed by the operator to select a kind of utility to be executed, a file allocation mode 14 is provided to achieve a new file allocation, and a file deletion mode 15 is used to delete a file. FIG. 3 is a flowchart illustrating a flow of processing in the program editing system of FIG. 1, FIG. 4 is a diagram showing a mode hierarchy figure displayed on the color CRT 3, and FIG. 5 is a diagram depicting data representing the correspondences between the mode names and positions in the mode hierarchy figure.

Figure 4:
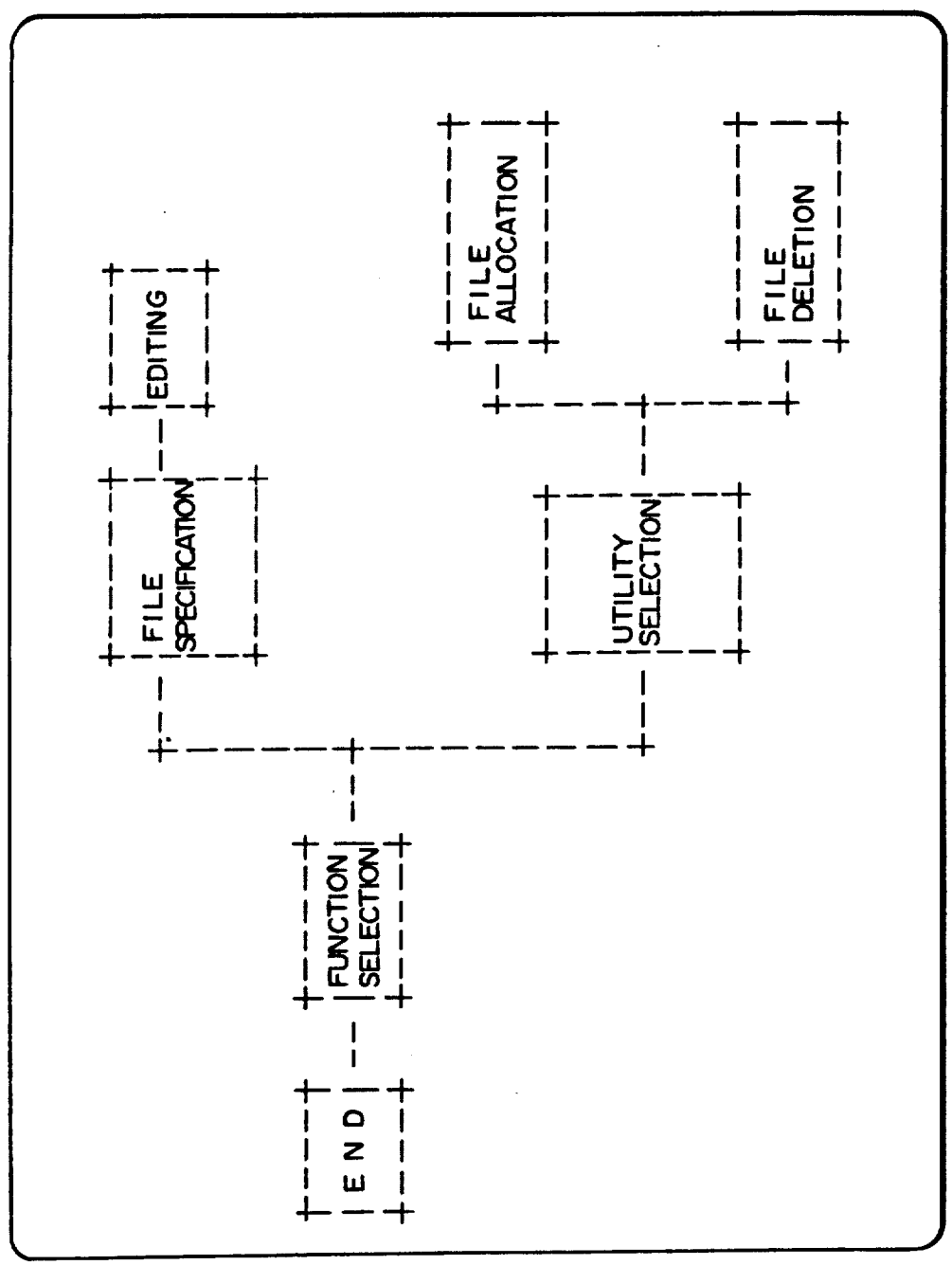
FIG. 4 is a diagram demonstrating a mode hierarchy figure displayed on a color CRT.

As indicated above, FIG. 4 is a diagram showing a mode hierarchy figure displayed on the color CRT 3 which is the same as the hierarchy figure shown in FIG. 2 of the present application. The hierarchy figure shown in FIG. 4 of the present application is the hierarchy figure that a programmer or user of the system would see looking upon the CRT 3 having rectangles representing the modes.

The hierarchy figure includes an end portion 200 which is the upper most part of the hierarchy figure, a function selection section 10, a file specification section 11, an editing section 12, a utility section 13, a file allocation section 14 and a file deletion section 15. Each section as noted above in FIG. 4, is the same as the modes shown in the hierarchy figure of FIG. 2.

FIG. 5 illustrates a table 300 containing data which provides correspondence between the mode names and positions on the CRT 3 corresponding to the modes of the hierarchy figure. The table 300 converts an X/Y position of a cursor on the CRT 3 to the appropriate mode of the hierarchy figure indicated by the cursor 11.

Referring now to FIG. 3, the processing flow will be described with the editing mode assumed to be the active mode. If the operator desires to proceed to the file deletion mode, the operator presses the function key of the keyboard 4 in the terminal 1 (101). On detecting the function key depression, the center computer 7 accesses a store area of the center computer 7 storing a data item indicating the active mode (102), generates data of the mode hierarchy figure so that only the rectangle associated with the active mode is displayed in red (103), and transfers the data to the terminal 1 (104). Based on this data, the processor 2 in the terminal 1 displays on the color CRT 3 the mode hierarchy figure shown in FIG. 4 (105).

When the mode hierarchy figure is displayed on the color CRT 3, the operator depresses the key for cursor on the keyboard to move the cursor to the position of the rectangle indicating the destination mode (the file deletion mode in this case) (106), then the transmission key is pressed (107). As a result, the center computer 7 detects the cursor position (108), calculates the destination mode (the file deletion mode in this case) requested by the operator by use of the data representing the correspondences between the mode names and positions in the mode hierarchy figure shown in FIG. 5 (109), and stores the data (fdl in this case) in an area of the center computer 7 storing data indicating the destination mode (110).

Next, the center computer 7 achieves the same processing as that executed to change the color of portion associated with the active mode into red so as to generate the data which causes only the rectangle corresponding to the destination mode to be displayed in yellow (111), and transfers the data to the terminal 1 (112). Based on the data, the terminal 1 displays the mode hierarchy figure (113). If the operator presses the transmission key again thereafter (114), the execution of the subroutine corresponding to the active mode is terminated (115), and the area storing the data indicating the destination mode is referenced (116). If the data does not indicate the end of execution of the program editing system (117), the content (fdl) of area storing data indicating the destination mode is set to an area storing data indicating the active mode (118), then a subroutine executing the mode (the file deletion mode in this case) associated with the data in the area storing data indicating the destination mode is called (119). However, if the area storing data indicating the destination mode contains a data item (end) indicating the end of execution of the program editing system (117), the end processing of the program editing system is accomplished.

In this embodiment, although the center computer 7 and the terminal 1 are separated in the system configuration, it should be understood that the present invention is applicable to a system configuration in which the computer and the terminal are not separated, for example, a personal computer. Furthermore, although a key for cursor is used to move the cursor in the embodiment, the present invention is naturally applicable to a system using a mouse to move the cursor or a light pen to specify a position on the screen.

A description has been made of a system for editing a program in the embodiment, however, the present invention is applicable to any systems such as a word processor and a data editing apparatus in which the execution modes are configured in a hierarchic structure. Particularly, the present invention is effective for a data editing apparatus handling tree data because the apparatus requires a large-sized hierarchic structure of execution modes.

An embodiment of the present invention has been described. According to the present invention, the following effect is attained.

(1) Since the execution mode can be changed only by specifying a portion of a figure displayed on the screen, the operator can change the mode without memorizing many commands, which minimizes the operator load to memorize commands and enables the beginner not versed in the operation to easily operate the system.

(2) The active mode can be changed to a mode widely apart therefrom in the hierarchic structure through simple procedures, which facilitates the operation and improves the operation efficiency.

(3) Since the active mode is displayed discriminately from other modes in the mode hierarchy figure, an operation error such that the active mode is mistakenly specified as the destination mode can be prevented.

(4) The destination mode is displayed discriminately from other modes in the mode hierarchy figure, which enables to confirm the destination mode and hence the operation error is minimized.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

I claim:

1. A method for changing from an active execution mode to a selected execution mode in a data processing system having a display unit for displaying information, selecting means for permitting an operator of said data processing system to select an execution mode by indicating, through use of an indicator, a specific position on a screen of said display unit and processing means for effecting processing operations corresponding to a selected execution mode, said execution mode being a mode of operation of said data processing system wherein only a processing operation from a predetermined set of processing operations can be effected by said data processing system, said method comprising the steps of:

displaying on said screen of said display unit a mode hierarchy figure representing hierarchical relations among execution modes of said data processing system, at the same time;

detecting, by said data processing system, a selection of an execution mode corresponding to a position in the mode hierarchy figure on said display unit indicated by said selecting means; and effecting a change from an active execution mode to said selected execution mode in accordance with said detected selection of an execution mode.

2. A method according to claim 1, further comprising the step of discriminating a portion of said screen of said display unit associated with an active execution mode in said mode hierarchic figure from all other portions of said screen by use of a predetermined color, an image degradation or a blinking effect.

3. A method according to claim 1, wherein said step of detecting a selection of an execution mode comprises the step of discriminating said position on said screen corresponding to said detected selection of an execution mode in said mode hierarchy figure from all other portions of said screen by use of a predetermined color, an image degradation or a blinking effect.

4. An apparatus for changing form an active execution mode to a selected execution mode in a data processing system having a display means, a central processing means for effecting processing operations corresponding to a selected execution mode and an input means for allowing an operator to communicate with said central processing means through said display means and for allowing said operator to select an execution mode by indicating a specific position on said display means, said execution mode being a mode of operation of said central processing means wherein only a processing operation from a predetermined set of processing operations can be effected by said central processing means, said apparatus comprising:
- means for displaying a mode hierarchy figure on said display means, said mode hierarchy figure representing hierarchical relations among execution modes of said data processing system, at the same time;
- means for detecting a selection of an execution mode, corresponding to a position in the mode hierarchy figure displayed on said display means on the basis of a table representing corresponding relationships between execution mode names and positions in said mode hierarchy figure, indicated by said input means; and
- means for effecting a change from an active execution mode to said selected execution mode in accordance with said detected selection of an execution mode.

5. An apparatus according to claim 4, further comprising:
- means for discriminating a portion of said mode hierarchy figure associated with an active execution mode, from other portions of said mode hierarchy figure, by use of a predetermined color, an image degradation or a blinking effect.

6. An apparatus according to claim 4, wherein said detecting means includes means for discriminating said selected execution mode in said mode hierarchy figure, from other portions of said mode hierarchy figure, by use of a predetermined color, an image degradation or a blinking effect.

* * * * *